United States Patent
Kurokawa (10) Patent No.: US 11,447,190 B2
(45) Date of Patent: Sep. 20, 2022

(54) STRUCTURE FOR REINFORCING FRAMEWORK MEMBER IN VEHICLE

(71) Applicant: Toyota Jidosha Kabushiki Kaisha, Toyota (JP)

(72) Inventor: Hiroyuki Kurokawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/328,324

(22) Filed: May 24, 2021

(65) Prior Publication Data

US 2022/0033007 A1 Feb. 3, 2022

(30) Foreign Application Priority Data

Jul. 28, 2020 (JP) .............................. JP2020-127709

(51) Int. Cl.
*B62D 29/04* (2006.01)
*B62D 25/06* (2006.01)

(52) U.S. Cl.
CPC ........... *B62D 29/043* (2013.01); *B62D 25/06* (2013.01)

(58) Field of Classification Search
CPC .............................. B62D 25/06; B62D 29/043
USPC .............. 296/23.01, 2, 3, 4, 210, 193.2, 204
See application file for complete search history.

(56) References Cited

U.S. PATENT DOCUMENTS 2,101,056 A * 12/1937 Frick ...................... B63B 19/16
52/783.12

FOREIGN PATENT DOCUMENTS

| CN | 2414984 Y | * | 1/2001 | |
|---|---|---|---|---|
| EP | 0134617 B1 | * | 1/1988 | ........... B29D 99/007 |
| FR | 2620375 A1 | * | 3/1989 | ........... B29C 53/585 |
| JP | 2003097370 A | * | 4/2003 | |
| JP | 4831615 B2 | * | 12/2011 | |
| JP | 2019-098706 A | | 6/2019 | |
| JP | 2020-032601 A | | 3/2020 | |
| JP | 2020-044929 A | | 3/2020 | |

* cited by examiner

*Primary Examiner* — Dennis H Pedder
(74) *Attorney, Agent, or Firm* — Dinsmore & Shohl LLP (57) ABSTRACT

A structure for reinforcing a framework member in a vehicle includes: a resin framework member that constitutes a part of a framework of a vehicle and is formed so as to have a closed cross-section; and a fiber-reinforced-resin reinforcing member. The reinforcing member has a first reinforcing part that is disposed so as to form a substantially U-shaped cross-section including one of surfaces of the framework member extending along the longitudinal direction, and a second reinforcing part that is disposed so as to form a substantially U-shaped cross-section including the other surface of the framework member extending along the longitudinal direction. At a minimum part of the framework member at which the cross-section is smallest, a portion of the first reinforcing part and a portion of the second reinforcing part are laid one on top of the other so as to overlap each other.

6 Claims, 7 Drawing Sheets

STRUCTURE FOR REINFORCING FRAMEWORK MEMBER IN VEHICLE

CROSS-REFERENCE TO RELATED APPLICATION

This application claims priority to Japanese Patent Application No. 2020-127709 filed on Jul. 28, 2020, incorporated herein by reference in its entirety.

BACKGROUND

1. Technical Field

The present disclosure relates to a structure for reinforcing a framework member in a vehicle.

2. Description of Related Art

A structure in which a resin framework member constituting a part of the framework of a vehicle is reinforced with fibers that are oriented along a longitudinal direction of the framework member has been hitherto known (see, e.g., Japanese Unexamined Patent Application Publication No. 2019-098706).

SUMMARY

However, when the cross-section of the resin framework member reinforced with fibers is not constant in size, such a structure may fail to secure sufficient strength and rigidity at a minimum part at which the cross-section is smallest.

It is therefore an object of the present disclosure to obtain a structure for reinforcing a framework member in a vehicle that can be applied to a resin framework member of which the cross-section is not constant in size to secure strength and rigidity of a minimum part of the framework member at which the cross-section is smallest.

To achieve this object, a structure for reinforcing a framework member in a vehicle described in a first aspect of the present disclosure includes: a resin framework member that constitutes a part of a framework of a vehicle and is formed so as to have a closed cross-section orthogonal to a longitudinal direction that is not constant in size; and a fiber-reinforced-resin reinforcing member that is molded integrally in a sheet form on a surface of the framework member. The reinforcing member has a first reinforcing part that is disposed so as to form a substantially U-shaped cross-section including one of surfaces of the framework member extending along the longitudinal direction, and a second reinforcing part that is disposed so as to form a substantially U-shaped cross-section including the other surface of the framework member extending along the longitudinal direction. At a minimum part of the framework member at which the cross-section is smallest, a portion of the first reinforcing part and a portion of the second reinforcing part are disposed one on top of the other so as to overlap each other.

According to the disclosure described in the first aspect, the resin framework member constituting a part of the framework of the vehicle is formed so as to have a closed cross-section orthogonal to the longitudinal direction that is not constant in size, and at the minimum part of the framework member at which the cross-section is smallest, respective portions of the first reinforcing part and the second reinforcing part composing the fiber-reinforced-resin reinforcing member are laid one on top of the other so as to overlap each other. Thus, this minimum part is reinforced by the fiber-reinforced-resin reinforcing member. As a result, strength and the rigidity of the minimum part are secured.

A structure for reinforcing a framework member in a vehicle described in a second aspect is the structure for reinforcing a framework member in a vehicle described in the first aspect, wherein fibers included in the first reinforcing part and the second reinforcing part are oriented along the longitudinal direction of the framework member.

According to the disclosure described in the second aspect, the fibers included in the first reinforcing part and the second reinforcing part are oriented along the longitudinal direction of the framework member. Thus, compared with when the fibers included in the first reinforcing part and the second reinforcing part are oriented along a direction orthogonal to the longitudinal direction of the framework member, the strength and the rigidity of the framework member in the longitudinal direction are enhanced.

A structure for reinforcing a framework member in a vehicle described in a third aspect is the structure for reinforcing a framework member in a vehicle described in the first or second aspect, further including a third reinforcing part that is disposed so as to form a substantially annular cross-section including the minimum part.

According to the disclosure described in the third aspect, the reinforcing member has the third reinforcing part that is disposed so as to form a substantially annular cross-section including the minimum part. Thus, compared with when the reinforcing member does not have the third reinforcing part, the minimum part of the framework member is reinforced more effectively.

A structure for reinforcing a framework member in a vehicle described in a fourth aspect is the structure for reinforcing a framework member in a vehicle described in the third aspect, wherein fibers included in the third reinforcing part are oriented along a direction orthogonal to the longitudinal direction of the framework member.

According to the disclosure described in the fourth aspect, the fibers included in the third reinforcing part are oriented along a direction orthogonal to the longitudinal direction of the framework member. Thus, compared with when the fibers included in the third reinforcing part are oriented along the longitudinal direction of the framework member, the strength and the rigidity of the third reinforcing part in a circumferential direction are enhanced.

A structure for reinforcing a framework member in a vehicle described in a fifth aspect is the structure for reinforcing a framework member in a vehicle described in any one of the first to fourth aspects, wherein the minimum part is a central part in the longitudinal direction of the framework member.

According to the disclosure described in the fifth aspect, the minimum part is the central part in the longitudinal direction of the framework member. This means that the central part in the longitudinal direction of the framework member is reinforced. Thus, even when a load is input into the framework member along the longitudinal direction, the minimum part of the framework member is less likely to undergo buckling deformation.

A structure for reinforcing a framework member in a vehicle described in a sixth aspect is the structure for reinforcing a framework member in a vehicle described in the fifth aspect, wherein maximum parts of the framework member at which the cross-section is largest are both end parts in the longitudinal direction of the framework member, and the first reinforcing part and the second reinforcing part are separated from each other at the maximum parts.

According to the disclosure described in the sixth aspect, the first reinforcing part and the second reinforcing part are separated from each other at the maximum parts. Here, the maximum parts are parts having higher strength and rigidity than the minimum part. Therefore, the maximum parts do not need to be reinforced by the fiber-reinforced-resin reinforcing member, and the lengths of the first reinforcing part and the second reinforcing part can be reduced as seen from the longitudinal direction of the framework member. Thus, compared with a configuration in which respective portions of the first reinforcing part and the second reinforcing part are laid one on top of the other so as to overlap each other also at the maximum parts, this configuration can keep down the manufacturing cost of the framework member with which the reinforcing member is integrally molded.

As has been described above, the present disclosure can be applied to a resin framework member of which the cross-section is not constant in size to secure strength and rigidity of the minimum part at which the cross-section is smallest.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment according to the present disclosure will be described in detail below based on the drawings. For the convenience of description, arrows UP, FR, and RH shown as necessary in the drawings indicate a vehicle upward direction, a vehicle frontward direction, and a vehicle rightward direction, respectively. Therefore, unless otherwise noted, the directions of up and down, front and rear, and left and right used in the following description mean up and down in a vehicle up-down direction, front and rear in a vehicle front-rear direction, and left and right in a vehicle left-right direction (vehicle width direction).

This embodiment will be described using a roof reinforcement 20 extending in the vehicle width direction as an example of a resin framework member constituting a part of the framework of a vehicle. The dimensional ratio shown in the drawings differs from the actual one. That is, when viewed with reference to the size of a pair of left and right brackets 30 to be described later, the actual roof reinforcement 20 is longer than it is shown in the drawings.

Figure 1:
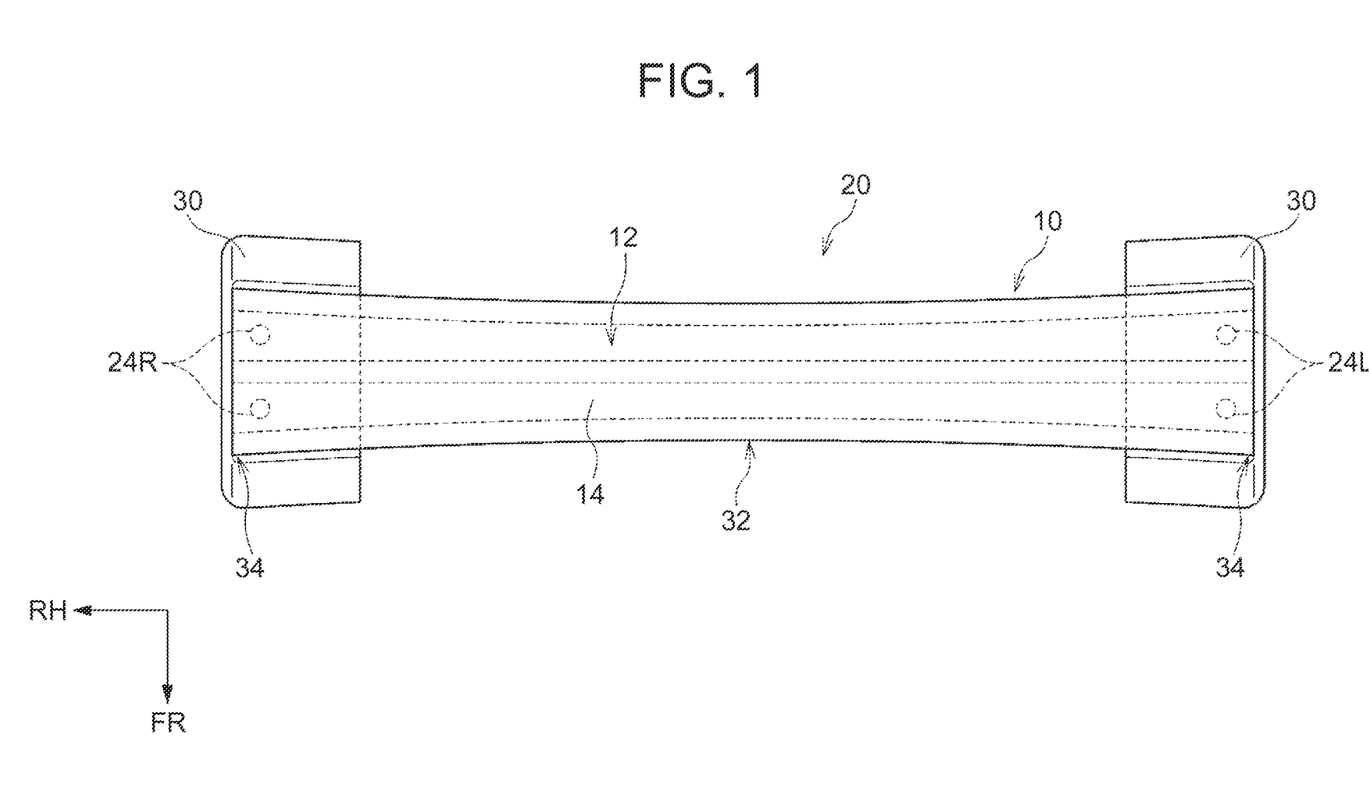
FIG. 1 is a plan view showing a structure for reinforcing a roof reinforcement according to an embodiment.
Figure 2:
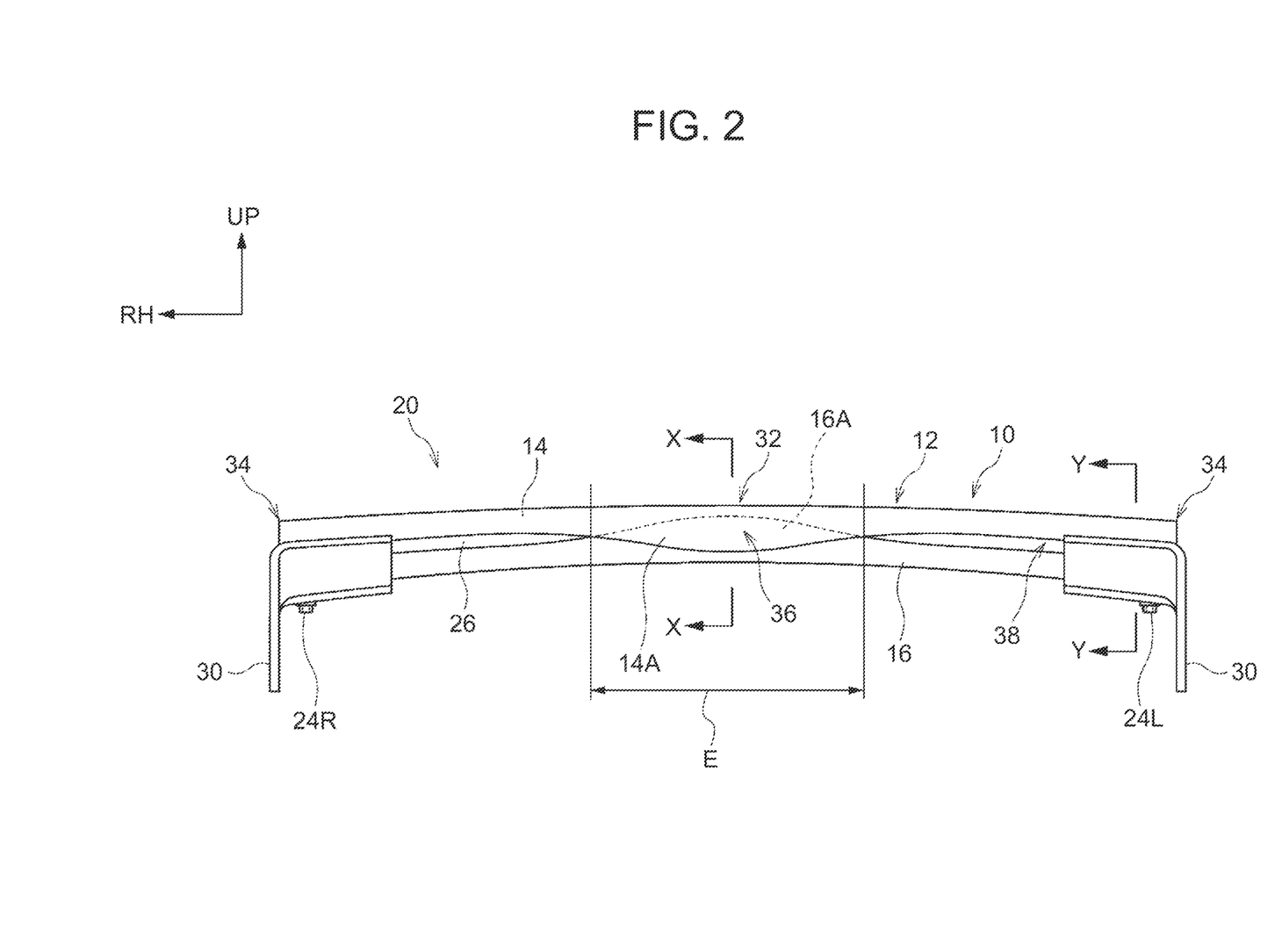
FIG. 2 is a side view showing the structure for reinforcing the roof reinforcement according to the embodiment.

As shown in FIG. 1 and FIG. 2, the roof reinforcement 20 is made of, for example, an inexpensive random fiber resin material as a base material and formed so as to have a rectangular closed cross-section orthogonal to a longitudinal direction that is not constant in size. Specifically, the roof reinforcement 20 curves upward as seen in a side view, and is formed so as to have a rectangular closed cross-section of which the width decreases gradually from both end parts in the longitudinal direction toward a central part in the longitudinal direction as seen in a plan view and a side view.

Thus, the central part in the longitudinal direction of the roof reinforcement 20 is a minimum part 32 at which the cross-section is smallest, and both end parts in the longitudinal direction of the roof reinforcement 20 are maximum parts 34 at which the cross-section is largest.

Figure 3:
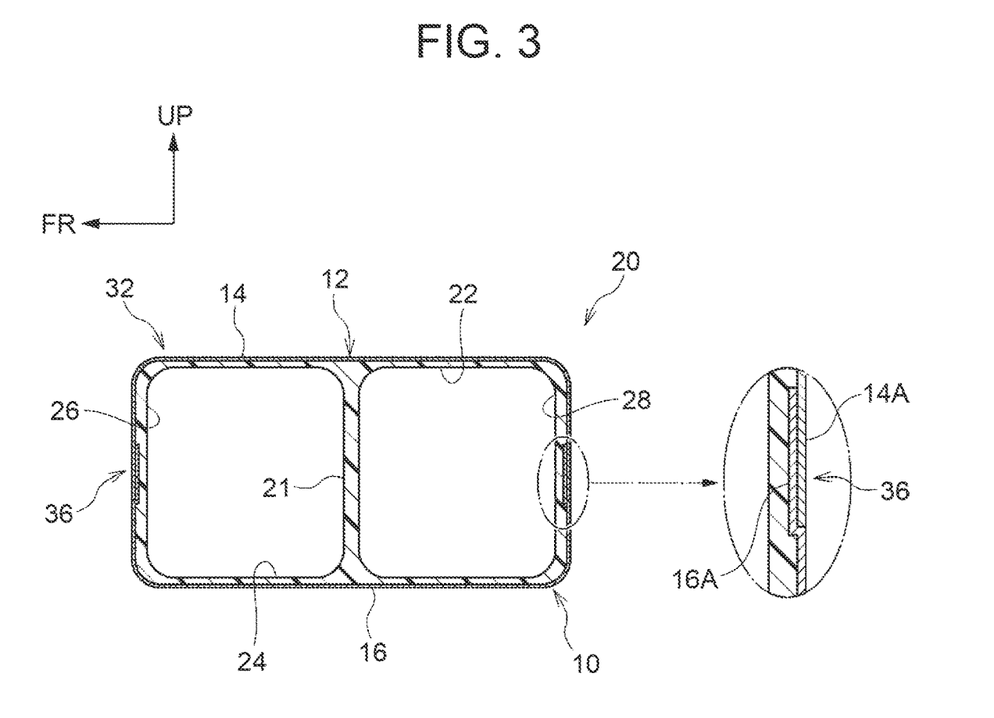
FIG. 3 is a sectional view taken along line X-X in FIG. 2.
Figure 4:
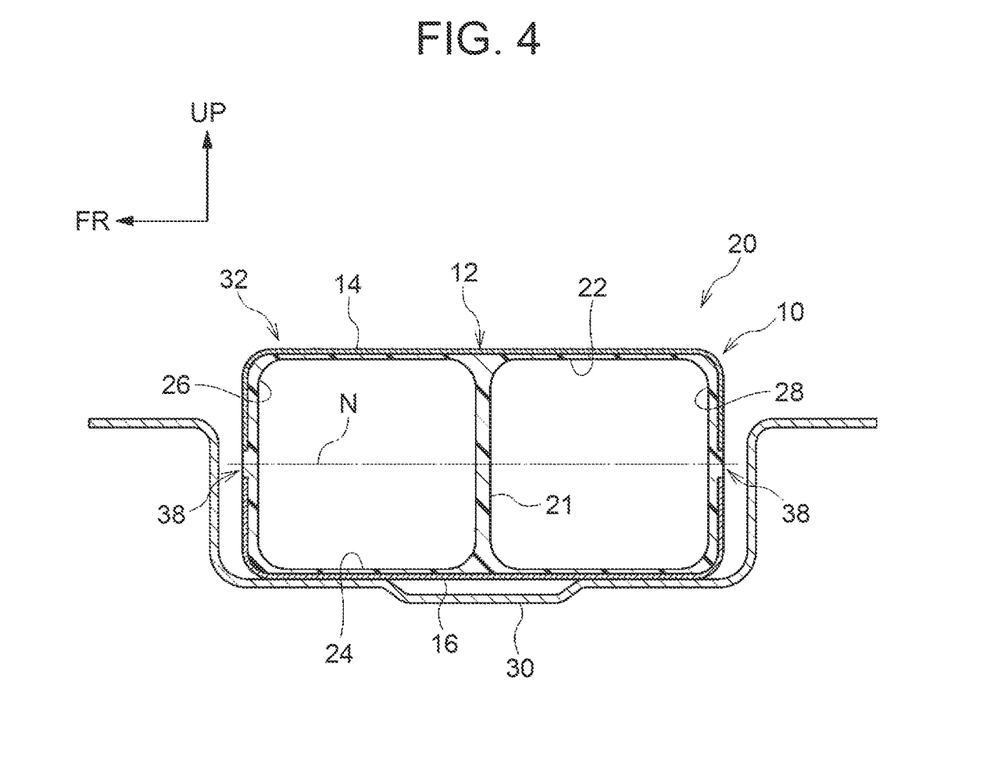
FIG. 4 is a sectional view taken along line Y-Y in FIG. 2.

As shown in FIG. 3 and FIG. 4, the roof reinforcement 20 is formed such that the width in a front-rear direction is larger than the height in an up-down direction (thickness) as seen in cross-section. That is, the roof reinforcement 20 is formed such that the width of an upper wall 22 and a lower wall 24 (the length in the front-rear direction) is larger than the height of a front wall 26 and a rear wall 28 as upright walls (the length in the up-down direction, i.e., the thickness).

A flat plate-shaped partition plate 21 facing the front-rear direction (disposed parallel to the front wall 26 and the rear wall 28) is integrally formed at the central part in the front-rear direction of an inside of the roof reinforcement 20, along the entire roof reinforcement 20 in the longitudinal direction. Thus, the roof reinforcement 20 is formed so as to substantially have the shape of the figure eight in cross-section.

A reinforcing member 12 constituting a part of the reinforcing structure 10 and made of fiber-reinforced resin containing continuous fibers, such as carbon fibers or glass fibers, is integrally molded in a sheet form and disposed on surfaces of portions of the roof reinforcement 20 (at least the upper wall 22 and the lower wall 24) that are distanced from a cross-section neutral axis N (see FIG. 4) in the up-down direction (height direction) of the roof reinforcement 20.

To be more specific, the reinforcing member 12 has a first reinforcing part 14 that is disposed so as to form a substantially U-shaped cross-section including one of surfaces of the roof reinforcement 20 extending along the longitudinal direction, i.e., the upper wall 22, and an upper-side portion of the front wall 26 and an upper-side portion of the rear wall 28, and a second reinforcing part 16 that is disposed so as to form a substantially U-shaped cross-section including the other surface of the roof reinforcement 20 extending along the longitudinal direction, i.e., the lower wall 24, and a lower-side portion of the front wall 26 and a lower-side portion of the rear wall 28.

As shown in FIG. 1 and FIG. 2, the first reinforcing part 14 and the second reinforcing part 16 extend in the longitudinal direction of the roof reinforcement 20 and are disposed along the entire length of the roof reinforcement 20. Although this is not shown, continuous fibers included in the first reinforcing part 14 and the second reinforcing part 16 are oriented along the longitudinal direction of the roof reinforcement 20.

That is, the continuous fibers included in the first reinforcing part 14 and the second reinforcing part 16 extend continuously from one end part (maximum part 34) including joints 24R on a right side (one side) provided at one end in the longitudinal direction of the lower wall 24 of the roof reinforcement 20 to the other end part (maximum part 34) including joints 24L on a left side (the other side) provided at the other end of the lower wall 24. The joints 24L, 24R connect both end parts in the longitudinal direction of the roof reinforcement 20 respectively to a pair of left and right roof side rails (not shown) through the brackets 30.

As shown in FIG. 2 and FIG. 3, the reinforcing member 12 is formed so as to be thicker along the front-rear direction at portions that are located at central portions in the up-down direction of the front wall 26 and the rear wall 28 (near the cross-section neutral axis N) in the minimum part 32 of the roof reinforcement 20.

To be more specific, in a predetermined region E at the central part in the longitudinal direction of the roof reinforcement 20 including the minimum part 32, portions 14A of the first reinforcing part 14 on the side of the front wall 26 and on the side of the rear wall 28 protrude downward in an arc shape, while portions 16A of the second reinforcing part 16 on the side of the front wall 26 and on the side of the rear wall 28 protrude upward in an arc shape. The portions 14A of the first reinforcing part 14 and the portions 16A of the second reinforcing part 16 protruding in an arc shape are laid one on top of the other so as to overlap each other.

Thus, in the predetermined region E at the central part in the longitudinal direction of the roof reinforcement 20 including the minimum part 32, substantially spindle-shaped overlapped portions 36 that are elongated in the longitudinal direction as seen in a front view and a rear view and that are also thicker are formed. At the overlapped portions 36 shown in the drawings, the portions 14A of the first reinforcing part 14 are laid over the portions 16A of the second reinforcing part 16, but conversely the portions 16A of the second reinforcing part 16 may be laid over the portions 14A of the first reinforcing part 14.

On the other hand, as shown in FIG. 2 and FIG. 4, exposed portions 38 that are not covered with the reinforcing member 12 are formed at central portions in the up-down direction of the front wall 26 and the rear wall 28 in the maximum parts 34 of the roof reinforcement 20. In other words, in predetermined regions at both end parts in the longitudinal direction of the roof reinforcement 20 including the maximum parts 34 (regions other than the region E), portions of the first reinforcing part 14 on the side of the front wall 26 and on the side of the rear wall 28 and portions of the second reinforcing part 16 on the side of the front wall 26 and on the side of the rear wall 28 are separated from each other, and thus the front wall 26 and the rear wall 28 are partially exposed.

Next, a molding method of the roof reinforcement 20 according to this embodiment will be described.

Figure 6:
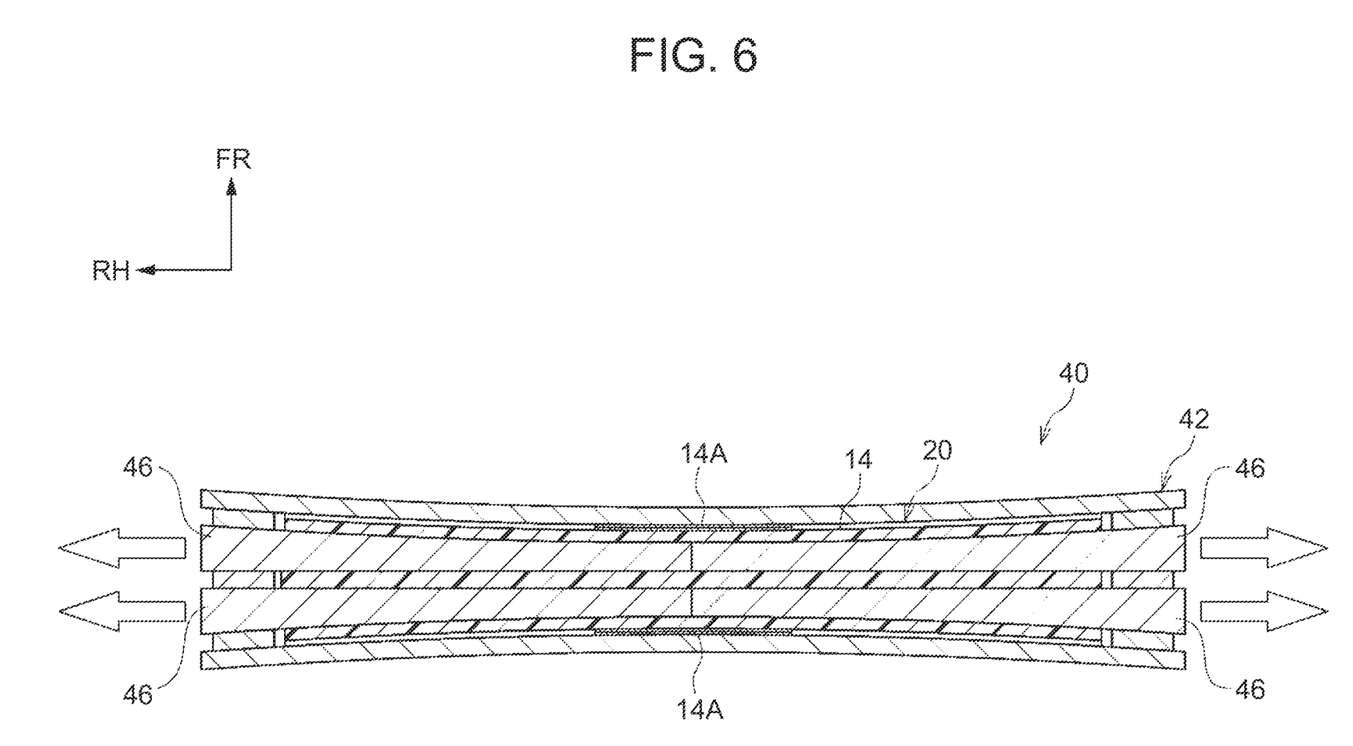
FIG. 6 is a bottom view showing a manufacturing method of the structure for reinforcing the roof reinforcement according to the embodiment.
Figure 7:
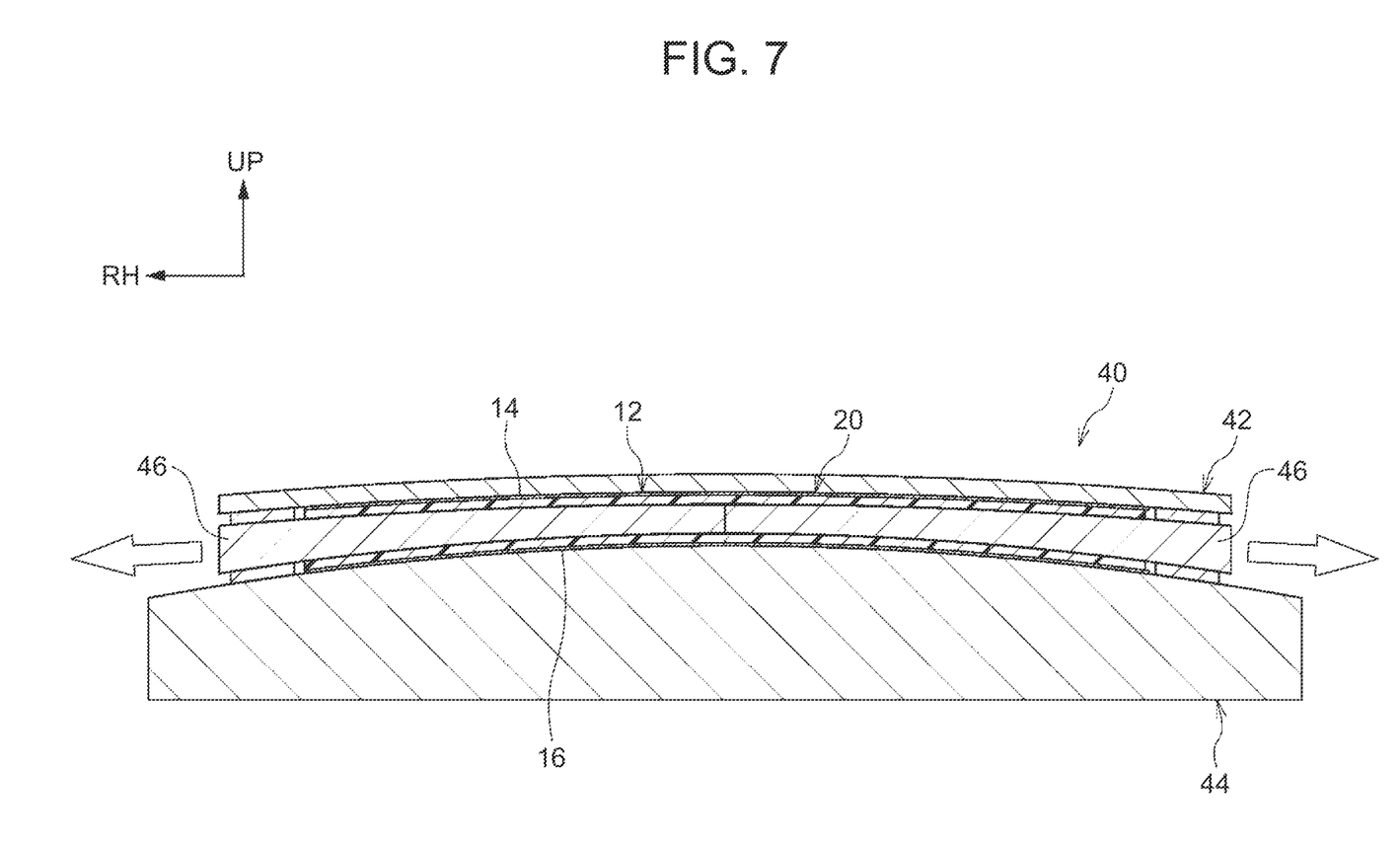
FIG. 7 is a side view showing the manufacturing method of the structure for reinforcing the roof reinforcement according to the embodiment.

As shown in FIG. 6 and FIG. 7, a mold 40 for molding the roof reinforcement 20 is composed of an upper mold 42 and a lower mold 44, and two cores 46 that are each separable into two at a central part in a longitudinal direction of the upper mold 42 are provided inside the upper mold 42. The number of the cores 46 is two because the roof reinforcement 20 is formed so as to substantially have the shape of the figure eight in cross-section.

The cores 46 are made separable into two at the central part in the longitudinal direction of the upper mold 42, because the roof reinforcement 20 curves upward as seen in a side view and is formed so as to have a rectangular closed cross-section of which the width decreases gradually from both end parts in the longitudinal direction toward the central part in the longitudinal direction as seen in a plan view and a side view.

If the cores 46 are not separable into two at the central part in the longitudinal direction of the upper mold 42, the cores 46 cannot be removed from the inside of the roof reinforcement 20 to an outer side in the longitudinal direction after the roof reinforcement 20 is molded. To make it easy to remove the cores 46 from the inside of the roof reinforcement 20, an upper wall, a lower wall, a front wall, and a rear wall of each core 46 are formed so as to be tapered along the shape of the inside of the roof reinforcement 20.

To mold the roof reinforcement 20, first, the reinforcing member 12 in a sheet form is set inside the mold 40. The reinforcing member 12, i.e., the first reinforcing part 14 and the second reinforcing part 16 before being set inside the mold 40 are each formed so as to have a substantially U-shaped cross-section that is constant in height in the longitudinal direction, and not formed beforehand so as to have a substantially U-shaped cross-section that is not constant in height in the longitudinal direction.

Figure 5:
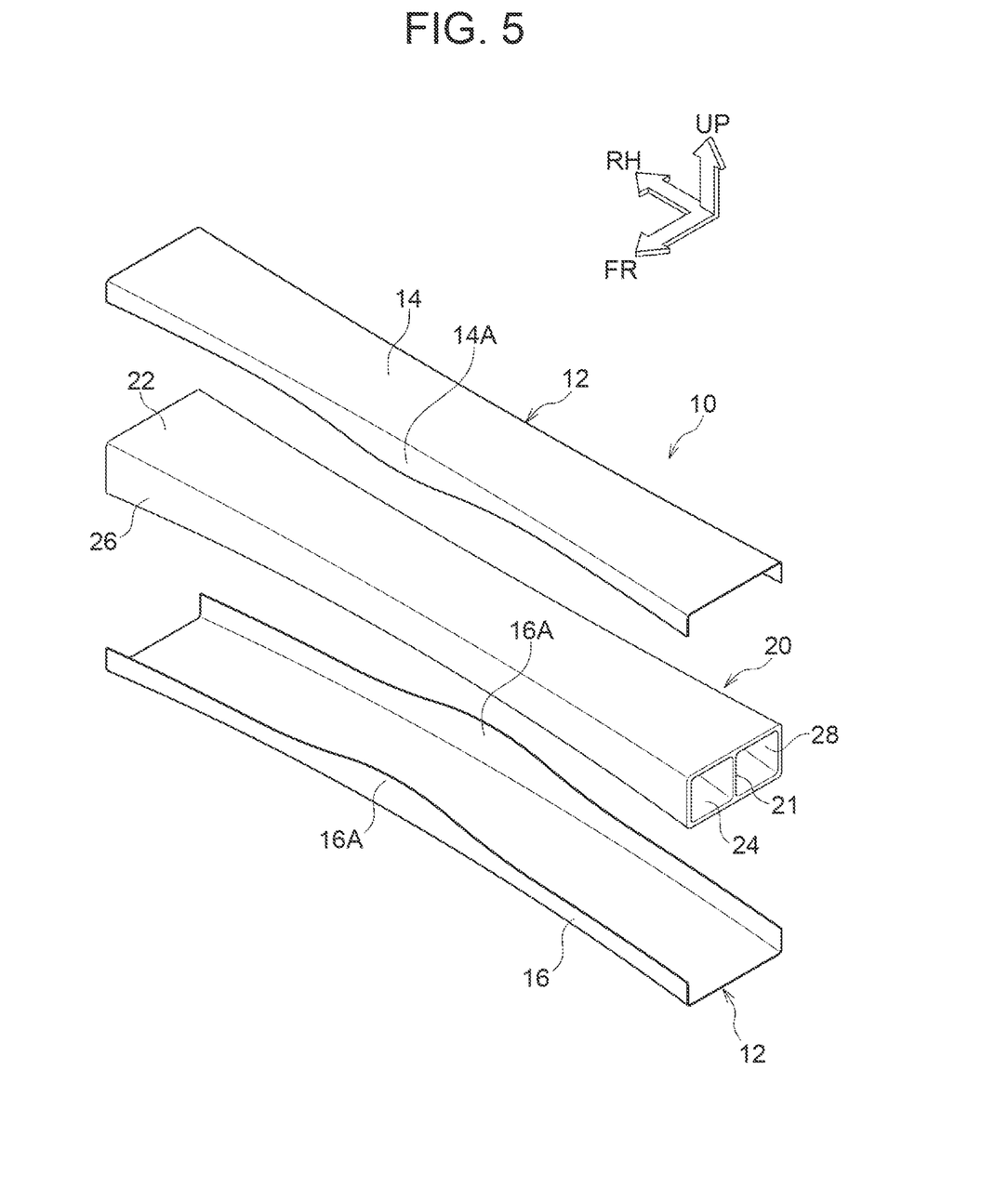
FIG. 5 is a perspective view showing the shape of a reinforcing member constituting a part of the reinforcing structure according to the embodiment.

Specifically, the first reinforcing part 14 and the second reinforcing part 16 are molded substantially into a U-shape in cross-section that is not constant in height in the longitudinal direction by being set inside the mold 40. FIG. 5 shows the shapes of the first reinforcing part 14 and the second reinforcing part 16 (reinforcing member 12) having been molded. This molding method can avoid creating portions that are wastefully discarded when producing the first reinforcing part 14 and the second reinforcing part 16 (reinforcing member 12).

Next, the roof reinforcement 20 is molded by the mold 40 in which the reinforcing member 12 (the first reinforcing part 14 and the second reinforcing part 16) has been set. That is, the cores 46 around which a random fiber resin material in a sheet form is wound are disposed inside the mold 40, and this random fiber resin material is cured to mold the roof reinforcement 20. Thus, the reinforcing member 12 is integrally molded in a sheet form on the surfaces of the roof reinforcement 20.

More specifically, the first reinforcing part 14 constituting a part of the reinforcing member 12 is disposed so as to form a substantially U-shaped cross-section including the upper wall 22 of the roof reinforcement 20 and the upper-side portions of the front wall 26 and the rear wall 28 thereof, and the second reinforcing part 16 constituting a part of the reinforcing member 12 is disposed so as to form a substantially U-shaped cross-section including the lower wall 24 of the roof reinforcement 20 and the lower-side portions of the front wall 26 and the rear wall 28 thereof.

Then, the portions 14A of the first reinforcing part 14 on the side of the front wall 26 and on the side of the rear wall 28 and the portions 16A of the second reinforcing part 16 on the side of the front wall 26 and on the side of the rear wall 28 are laid one on top of the other so as to overlap each other in the predetermined region E (see FIG. 2) of the roof reinforcement 20 including the minimum part 32, and thus the overlapped portions 36 are formed.

Meanwhile, portions of the first reinforcing part 14 on the side of the front wall 26 and on the side of the rear wall 28 and portions of the second reinforcing part 16 on the side of the front wall 26 and on the side of the rear wall 28 are separated from each other in the predetermined regions of the roof reinforcement 20 including the maximum parts 34 (regions other than the region E), and thus the exposed portions 38 are formed.

When the roof reinforcement 20 has been thus molded inside the mold 40, the cores 46 are each separated at the central part in the longitudinal direction and respectively removed from both end sides in the longitudinal direction of the roof reinforcement 20. Since the upper wall, the lower wall, the front wall, and the rear wall of each core 46 are formed so as to be tapered along the shape of the inside of the roof reinforcement 20, the cores 46 are smoothly released from inside the mold 40.

When the cores 46 have been removed from inside the upper mold 42 toward the outer sides in the longitudinal direction, the upper mold 42 is raised so as to be separated from the lower mold 44. Thus, the roof reinforcement 20 formed substantially in the shape of the figure eight in cross-section with the reinforcing member 12 integrally molded on the surfaces is completed and thereafter taken out of the lower mold 44.

Next, effects of the reinforcing structure 10 for the roof reinforcement 20 according to this embodiment will be described.

As described above, the roof reinforcement 20 is reinforced by the reinforcing member 12. In particular, at the minimum part 32 of the roof reinforcement 20, the portions 14A of the first reinforcing part 14 on the side of the front wall 26 and on the side of the rear wall 28 and the portions 16A of the second reinforcing part 16 on the side of the front wall 26 and on the side of the rear wall 28 are laid one on top of the other so as to overlap each other, and thus the overlapped portions 36 with an increased thickness are formed.

Thus, the minimum part 32 of the roof reinforcement 20 can be reinforced by the overlapped portions 36 to secure strength and rigidity at the minimum part 32. In other words, unevenness in strength and rigidity in the longitudinal direction can be reduced even in the roof reinforcement 20 having a closed cross-section orthogonal to the longitudinal direction that is not constant in size.

Therefore, even when a load is input into the roof reinforcement 20 along the longitudinal direction and a bending moment at the minimum part 32 becomes maximum and causes elastic sectional deformation at the minimum part 32, the minimum part 32 is less likely to undergo plastic buckling deformation in the end.

Since the minimum part 32 of the roof reinforcement 20 can be reinforced by the overlapped portions 36, the above-described configuration can make the roof reinforcement 20 lighter compared with a configuration in which the minimum part 32 of the roof reinforcement 20 is reinforced by, for example, increasing the plate thickness of the minimum part 32.

The continuous fibers included in the first reinforcing part 14 and the second reinforcing part 16 are oriented along the longitudinal direction of the roof reinforcement 20, along the entire length of the roof reinforcement 20. Thus, compared with when the continuous fibers included in the first reinforcing part 14 and the second reinforcing part 16 are oriented along a direction orthogonal to the longitudinal direction of the roof reinforcement 20, the strength and the rigidity of the roof reinforcement 20 in the longitudinal direction can be enhanced.

At the maximum parts 34 of the roof reinforcement 20, the portions of the first reinforcing part 14 on the side of the front wall 26 and on the side of the rear wall 28 and the portions of the second reinforcing part 16 on the side of the front wall 26 and on the side of the rear wall 28 are separated from each other. That is, the exposed portions 38 at which the front wall 26 and the rear wall 28 are partially exposed are formed at the central portions in the up-down direction of the front wall 26 and the rear wall 28 in the maximum parts 34.

Here, the maximum parts 34 are parts having higher strength and rigidity than the minimum part 32. Therefore, the maximum parts 34 do not need to be reinforced by the reinforcing member 12, and the lengths of the portions of the first reinforcing part 14 on the side of the front wall 26 and on the side of the rear wall 28 and the lengths of the portions of the second reinforcing part 16 on the side of the front wall 26 and on the side of the rear wall 28 can be reduced as seen from the longitudinal direction of the roof reinforcement 20.

Thus, compared with a configuration in which the portions of the first reinforcing part 14 on the side of the front wall 26 and on the side of the rear wall 28 and the portions of the second reinforcing part 16 on the side of the front wall 26 and on the side of the rear wall 28 are laid one on top of the other so as to overlap each other also at the maximum parts 34, the above-described configuration can keep down the manufacturing cost of the roof reinforcement 20 with which the reinforcing member 12 is integrally molded.

While the effects of the reinforcing structure 10 for the roof reinforcement 20 according to the embodiment have been described above, the reinforcing structure 10 for the roof reinforcement 20 according to the embodiment may also have the following configuration.

Figure 8:
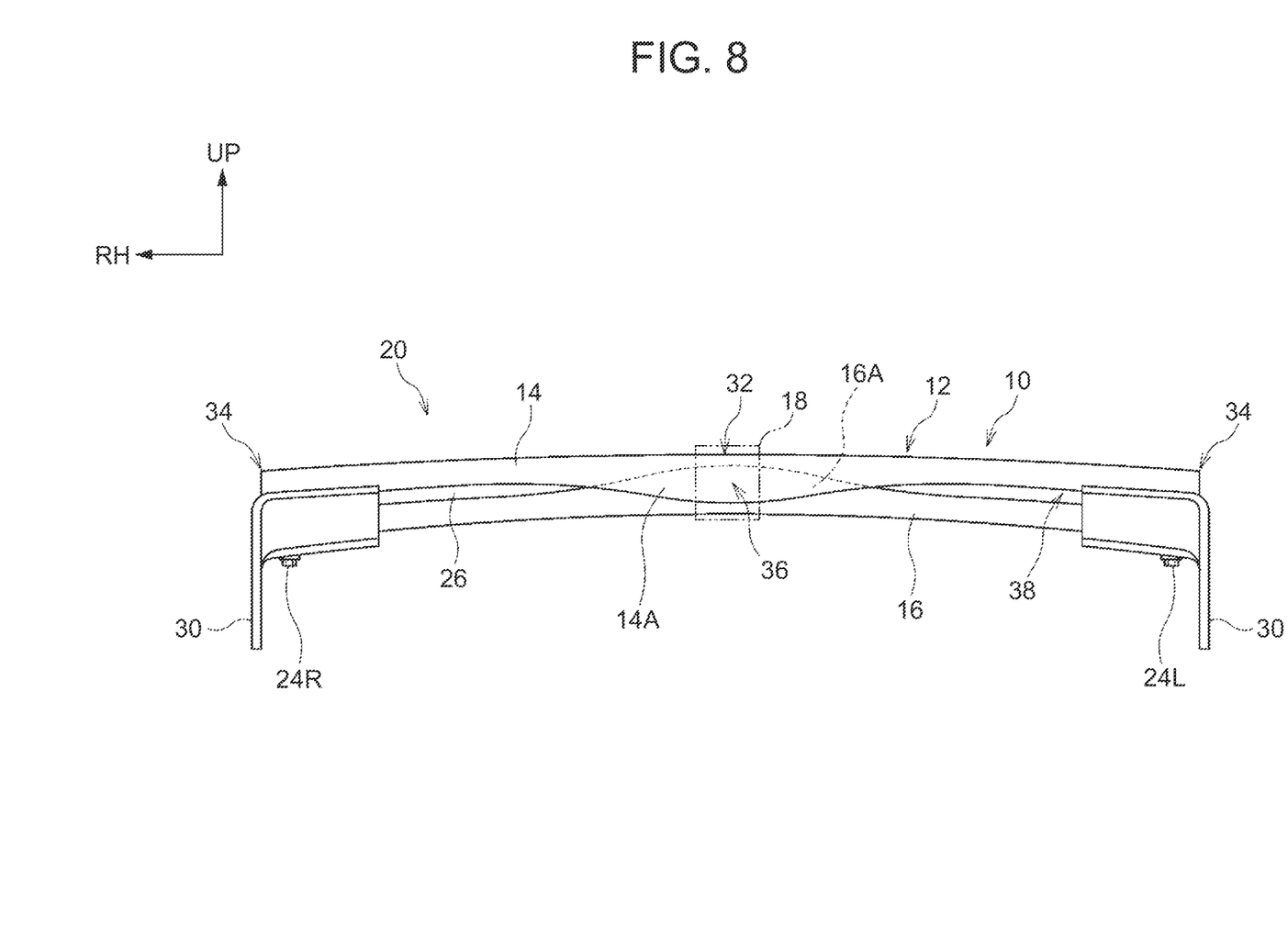
FIG. 8 is a side view showing a modified example of the structure for reinforcing the roof reinforcement according to the embodiment.

As shown in FIG. 8, the reinforcing member 12 may have a third reinforcing part 18 that is disposed so as to form a substantially annular cross-section including the minimum part 32 of the roof reinforcement 20. Specifically, the third reinforcing part 18 having a shape of a tube with a predetermined width in the longitudinal direction may be provided within the predetermined region E at the central part in the longitudinal direction of the roof reinforcement 20 including the minimum part 32, in a state of being wrapped around a portion of the roof reinforcement 20.

Continuous fibers included in the third reinforcing part 18 are oriented along a direction orthogonal to the longitudinal direction of the roof reinforcement 20. This means that the continuous fibers included in the third reinforcing part 18 are oriented along a circumferential direction thereof. The portion where the third reinforcing part 18 is provided needs to be only within the predetermined region E at the central part in the longitudinal direction of the roof reinforcement 20 including the minimum part 32.

The third reinforcing part 18 may be wrapped on an outer side of the overlapped portions 36 as shown in the drawing, or may be wrapped on an inner side of the overlapped portions 36. While the third reinforcing part 18 is shown in FIG. 8 as if wrapped so as to leave a clearance, the third reinforcing part 18 is actually wrapped in a state of being in close contact with the overlapped portions 36 or the central part in the longitudinal direction of the roof reinforcement 20. The third reinforcing part 18 may be formed so as to have a substantially C-shaped cross-section with a slight gap, instead of a complete annular shape.

When the reinforcing member 12 has such a third reinforcing part 18, the thickness of the reinforcing member 12 can be further increased at a portion located in the predetermined region E of the roof reinforcement 20 including the minimum part 32 (at central portions in the up-down direction of the front wall 26 and the rear wall 28). Thus, compared with when the reinforcing member 12 does not have the third reinforcing part 18, the minimum part 32 of the roof reinforcement 20 can be reinforced more effectively.

As described above, the continuous fibers included in the third reinforcing part 18 are oriented along the direction (circumferential direction) orthogonal to the longitudinal direction of the roof reinforcement 20. Thus, compared with when the continuous fibers included in the third reinforcing part 18 are oriented along the longitudinal direction of the roof reinforcement 20, the strength and the rigidity of the third reinforcing part 18 in the circumferential direction can be enhanced.

While the reinforcing structure 10 for the roof reinforcement 20 (the framework member in the vehicle) according to the embodiment has been described above based on the drawings, the reinforcing structure 10 according to the embodiment is not limited to that shown in the drawings, and design changes can be made thereto as necessary within the scope of the gist of the present disclosure. For example, the framework member is not limited to the roof reinforcement 20, and may instead be a roof side rail, a rocker, a front pillar, etc. (not shown).

Further, the framework member is not limited to a member having a rectangular shape in cross-section like the roof reinforcement 20, and may instead be formed so as to have, for example, a substantially elliptical shape in cross-section. In addition, the closed cross-sectional shape of the roof reinforcement 20 is not limited to substantially the shape of the figure eight shown in the drawings, and the roof reinforcement 20 may instead have, for example, a closed cross-section in which no partition plate 21 is formed or a closed cross-section in which two or more partition plates 21 are formed at intervals in the front-rear direction.

The base material composing the framework member, which is a reinforcing structure different from the reinforcing structure 10 according to the embodiment, may be a metal material, such as aluminum, instead of a random fiber resin material. In this case, the reinforcing member 12 can be attached to the metal framework member by an adhesive or the like.

What is claimed is:

1. A structure for reinforcing a framework member in a vehicle, the structure comprising:
    a resin framework member that constitutes a part of a framework of a vehicle and is formed so as to have a closed cross-section orthogonal to a longitudinal direction that is not constant in size; and
    a fiber-reinforced-resin reinforcing member that is molded integrally in a sheet form on a surface of the framework member, wherein:
the reinforcing member has:
    a first reinforcing part that is disposed so as to form a substantially U-shaped cross-section including one of surfaces of the framework member extending along the longitudinal direction; and
    a second reinforcing part that is disposed so as to form a substantially U-shaped cross-section including the other surface of the framework member extending along the longitudinal direction; and
at a minimum part of the framework member at which the cross-section is smallest, a portion of the first reinforcing part and a portion of the second reinforcing part are laid one on top of the other so as to overlap each other.

2. The structure for reinforcing a framework member in a vehicle according to claim 1, wherein fibers included in the first reinforcing part and the second reinforcing part are oriented along the longitudinal direction of the framework member.

3. The structure for reinforcing a framework member in a vehicle according to claim 1, further comprising a third reinforcing part that is disposed so as to form a substantially annular cross-section including the minimum part.

4. The structure for reinforcing a framework member in a vehicle according to claim 3, wherein fibers included in the third reinforcing part are oriented along a direction orthogonal to the longitudinal direction of the framework member.

5. The structure for reinforcing a framework member in a vehicle according to claim 1, wherein the minimum part is a central part in the longitudinal direction of the framework member.

6. The structure for reinforcing a framework member in a vehicle according to claim 5, wherein maximum parts of the framework member at which the cross-section is largest are both end parts in the longitudinal direction of the framework member, and the first reinforcing part and the second reinforcing part are separated from each other at the maximum parts.

\* \* \* \* \*